R. R. ROGERS.
STERILIZING AND SHAKING MACHINE.
APPLICATION FILED AUG. 22, 1908.
1,010,805.
Patented Dec. 5, 1911.
2 SHEETS—SHEET 1.
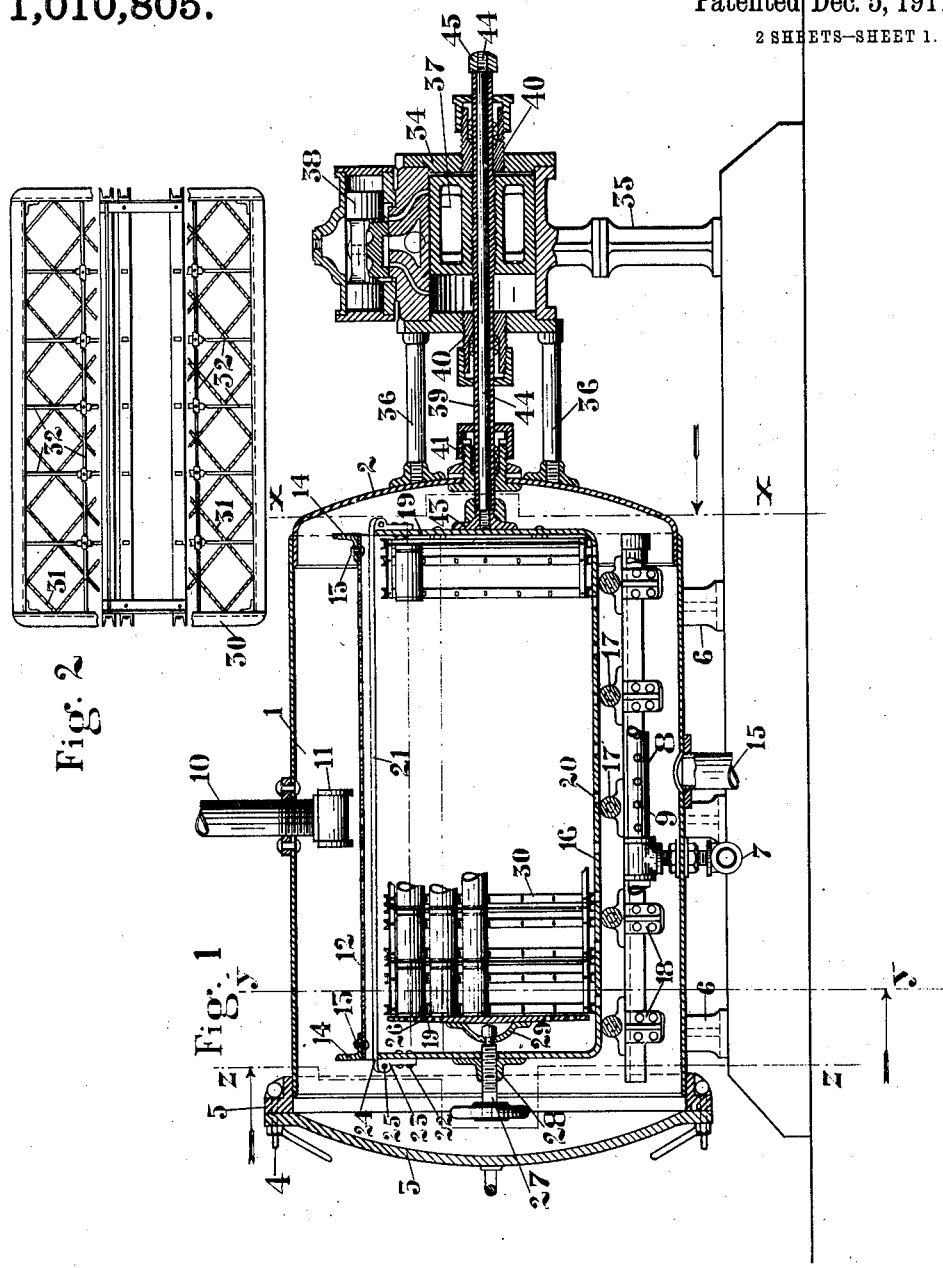
WITNESSES:
INVENTOR
RAYMOND R. ROGERS
BY
ATTORNEYS R. R. ROGERS.
STERILIZING AND SHAKING MACHINE.
APPLICATION FILED AUG. 22, 1908.
1,010,805.
Patented Dec. 5, 1911.
2 SHEETS—SHEET 2.
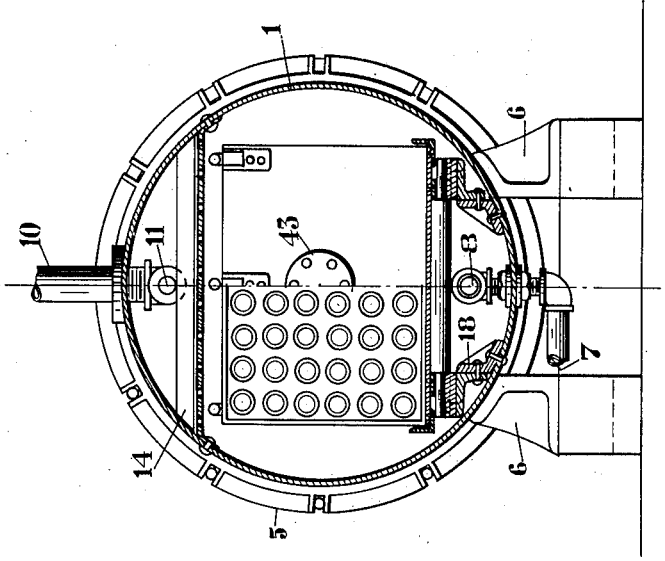
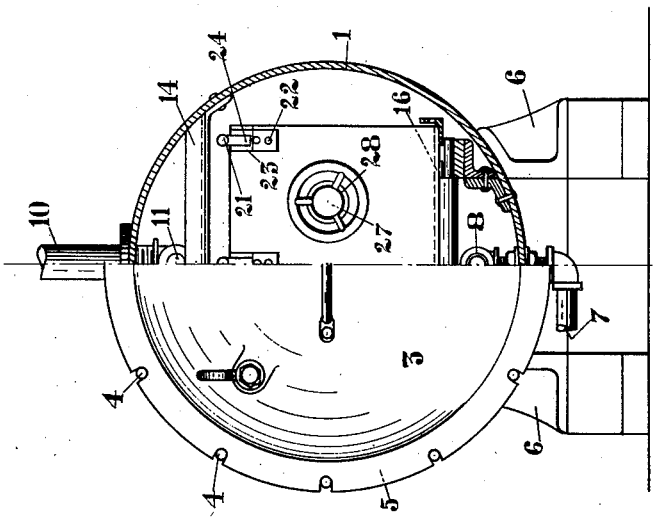
WITNESSES:
INVENTOR
RAYMOND R. ROGERS
BY
ATTORNEYS

UNITED STATES PATENT OFFICE.

RAYMOND R. ROGERS, OF DETROIT, MICHIGAN.

STERILIZING AND SHAKING MACHINE.

1,010,805.  Specification of Letters Patent.  Patented Dec. 5, 1911.

Application filed August 22, 1908. Serial No. 449,778.

*To all whom it may concern:*

Be it known that I, RAYMOND R. ROGERS, a citizen of the United States of America, residing at Detroit, in the county of Wayne and State of Michigan, have invented certain new and useful Improvements in Sterilizing and Shaking Machines, of which the following is a specification, reference being had therein to the accompanying drawings.

In the process of preparing condensed milk for market it is usual, as a final step, to sterilize the canned product by subjecting it to a high heat for a short period. It is necessary that the contents of each can be evenly heated throughout and that provision be made to prevent over-heating and caking or lumping of the outer portions of the contents of the cans. Furthermore, in reducing the temperature to normal, it is necessary that the cooling be as uniform as is the heating, for otherwise portions would be held at high heat too long and become injured thereby. It is further desirable that the goods be treated in as large quantities as possible.

This invention relates to an apparatus for sterilizing canned goods, such as condensed milk or the like, arranged for heating a large number of cans or packages simultaneously, and more especially to means for uniformly heating and cooling the contents of the cans, and for preventing any over-heating, caking or lumping during the process.

The invention consists in the matters hereinafter set forth, and more particularly pointed out in the appended claims.

Referring to the drawings, Figure 1 is a view in longitudinal section of an apparatus embodying features of the invention. Fig. 2 is a view in detail of a can rack. Fig. 3 is a view, partly in end elevation and partly in section on or about line z—z of Fig. 1. Fig. 4 is a view partly in section on line x—x of Fig. 1, and part in section on line y—y of Fig. 1.

In the drawings, a casing 1 preferably a horizontal cylinder or drum having one end permanently closed by an end wall 2 or head, and the other end provided with removable head 3 detachably secured by suitable means, as for example, clamping bolts 4 engaging a flange 5 and peripheral notches in the head, is supported on pedestals 6 or the like.

A suitable steam inlet pipe 7 through the bottom of the shell discharges into a horizontal perforated pipe 8 that extends longitudinally of the drum with closed extremities, the apertures 9 being preferably disposed to direct the steam laterally and downwardly only; a water pipe 10 with horizontal T 11 discharging longitudinally of the drum, is secured centrally in the top of the drum. A perforated plate 12 is supported horizontally below the water inlet by suitable cross-bars 13 near each end of the drum, and acts as a distributer for water flowing from the T, the bars 13 being preferably angle irons whose upturned flanges 14 act as ledges to arrest the water. A drain pipe 15 is centrally located in the lower part of the shell.

A carrier 16 is reciprocably mounted below the distributing plate on any suitable track or guideway, which, in its preferred form, consists of a series of horizontal alined rollers 17 journaled in properly designed bearing brackets 18 on the interior of the shell. As herein shown, the carrier consists of a sheet metal plate with upturned parallel ends 19, perforations 20 in the body being provided to allow free circulation around the contents of the carrier. Stay rods 21 connect the ends and are detachably secured thereto, as by brackets 22 having lugs 23 between which end plates 24 on the rods are retained by cross-pins 25 or the like.

An upright presser plate 26 is adjustably secured in the carrier by hand-screws 27 engaging bosses 28 in the carrier end, and spiders 29 on the presser, or by other suitable means, whereby it may exert endwise pressure on and force tiers of cans held in suitable upright racks 30 against the opposite carrier end plate. The racks are preferably made with angle iron frames with diagonal spacing wires 31 forming meshes each adapted to receive a can, other stiffening cross-bars 32 being used if desired. The parts are so disposed that when the carrier is filled with loaded racks and the presser plate set up by the hand-screws the cans abut so that they form substantially continuous cylinders in spaced relation extending from the end plate to the presser.

A cylinder 34 is held in axial alinement with the drum 1 on a pedestal 35 by stud bolts 36 or the like, and is provided with a piston 37 and a valve 38 adapted to automatically reciprocate when compressed air or steam is admitted thereto, the ports and passages being disposed to obtain this result in the conventional manner of steam pumps or the like, the details of construction and operation not being herein described as the mechanism is not, *per se*, a part of this invention. The piston is secured in proper manner on a hollow shaft 39, which extends through packing glands 40 on the cylinder head, and through a stuffing box 41 in the end wall 2 of the drum, and is removably held against a boss 43 on the carrier by a solid rod 44 screwed into the boss or otherwise rigidly fastened thereto, that extends through the shaft and is held by a nut 45 on its outer end. By this arrangement, the carriage may be either withdrawn or coupled to the operating means without entering the drum or disturbing the packing or stuffing glands.

While the form of carrier reciprocating means herein shown is preferable, any suitable means may be used for this purpose.

In operation, the carrier is loaded with filled trays and the cans clamped thereon. The carrier is then slid into the casing and connected with the operating means. The casing is closed, and steam under pressure admitted, the distributing pipe with its lateral opening directing the steam against the shell walls so that it circulates freely around the drum and through the tiers of cans which are being reciprocated with the carrier. This endwise shaking movement prevents any caking or lumping in the cans, and agitates the contents of each so that it becomes evenly heated. After being held at the desired temperature for the necessary period of time, water is injected, the perforated shield distributing it evenly over the carrier and cans whose agitation is continued until the can contents is properly cooled. The carrier is then removed from the shell and unloaded. By this means, the contents of each can is evenly heated and cooled throughout and cannot cake or become lumpy. Furthermore, the peculiar clamping arrangement not only provides for even distribution of steam between the cans, but also prevents any rattling of the packages and consequent denting or battering and a large number of cans may be treated at a time.

Obviously changes in the details of construction may be made without departing from the spirit of the invention and I do not care to limit myself to any particular form or arrangement of parts.

What I claim as my invention is:—

1. In a sterilizing apparatus, a can carrier consisting of a horizontal perforated plate with upturned, parallel ends, detachable stay-rods connecting the upper margins of the plate ends, an upright presser plate between the plate ends, hand-screws adapted to adjustably secure the presser plate, and racks adapted to be inserted between the presser plate and carrier end, and provided with spacing members adapted to hold cans therein in spaced relation, said presser plate being adapted to hold the tiers of cans of a series of inserted racks in abutting relation against the opposing carrier end.

2. A sterilizing apparatus comprising a casing closed at one end, a head detachably secured on the other end, a guide way in the casing, a can carrier on the guideway removable through the opened end of the casing consisting of a horizontal perforated plate with upturned-parallel ends, detachable stay-rods connecting the upper margins of the plate ends, an upright presser plate between the plate ends, hand screws adapted to adjustably secure the presser plate, racks adapted to be inserted between the presser plate and carrier end, and provided with spacing members adapted to hold cans therein in spaced relation, said presser plate being adapted to hold the tiers of cans of a series of inserted racks in abutting relation against the opposing carrier end, a water pipe opening into the top of the casing over the carrier, a distributing plate between the pipe mouth and carrier, a steam pipe in the casing having a distributing member extending below the casing, and means for reciprocating the carrier.

In testimony whereof I affix my signature in presence of two witnesses.

RAYMOND R. ROGERS.

Witnesses:
C. R. STICKNEY,
A. M. DORR.